(12) United States Patent
Felsenthal

(10) Patent No.: US 6,886,789 B2
(45) Date of Patent: May 3, 2005

(54) FOLDABLE STAND STABILIZER DEVICE

(76) Inventor: Sandy A. Felsenthal, 5428 Collingwood Cove, Memphis, TN (US) 38117

( * ) Notice: Subject to any disclaimer, the term of this patent is extended or adjusted under 35 U.S.C. 154(b) by 101 days.

(21) Appl. No.: 10/405,929

(22) Filed: Apr. 3, 2003

(65) Prior Publication Data

US 2004/0195475 A1 Oct. 7, 2004

(51) Int. Cl.[7] ............................................. A47B 91/00
(52) U.S. Cl. ................................... 248/188.9; 248/677
(58) Field of Search .............................. 135/82, 86, 77, 135/84, 68; D34/14; 248/188.9, 677, 188.8, 188.91, 188.2; 38/137

(56) References Cited

U.S. PATENT DOCUMENTS

| | | | |
|---|---|---|---|
| 652,981 A | | 7/1900 | Pratt |
| 2,277,939 A | * | 3/1942 | Thalhammer ............ 248/188.9 |
| 2,661,554 A | | 8/1953 | Siczkiewicz, Jr. et al. |
| 3,093,172 A | | 6/1963 | Reed |
| 4,068,815 A | * | 1/1978 | Losert ..................... 248/188.2 |
| 4,069,893 A | * | 1/1978 | Blackstone ................. 182/200 |
| 4,943,024 A | * | 7/1990 | Meyer ..................... 248/316.7 |
| 4,970,968 A | | 11/1990 | Mattesky |
| 5,335,432 A | * | 8/1994 | Simpson ..................... 38/106 |
| 5,357,640 A | * | 10/1994 | McKenney et al. ........ 5/81.1 R |
| 6,014,827 A | | 1/2000 | Lehrman |

* cited by examiner

Primary Examiner—Ramon O Ramirez
(74) Attorney, Agent, or Firm—Breneman & Georges; William D. Breneman, Esq.; Todd A. Vaughn, Esq.

(57) ABSTRACT

A novel rotatable stabilizing device is provided for stabilizing foldable legs of ironing boards, keyboard stands legs of ironing boards, keyboard stands and the like on various types of floor surfaces by providing at least two different stabilizing surfaces along the axial length of the rotatable stabilizing device. The novel rotatable stabilizing device may include a variety of means for rotating the device to expose the different types of stabilizing surfaces and may be utilized as an add on device for existing stands or incorporated into a new generation of novel stands incorporating the novel rotatable stabilizing device.

22 Claims, 5 Drawing Sheets

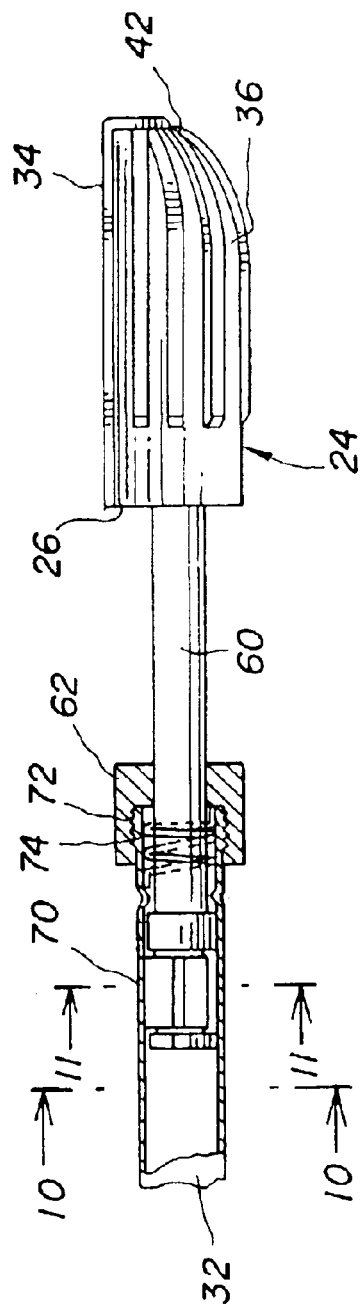
Fig. 9
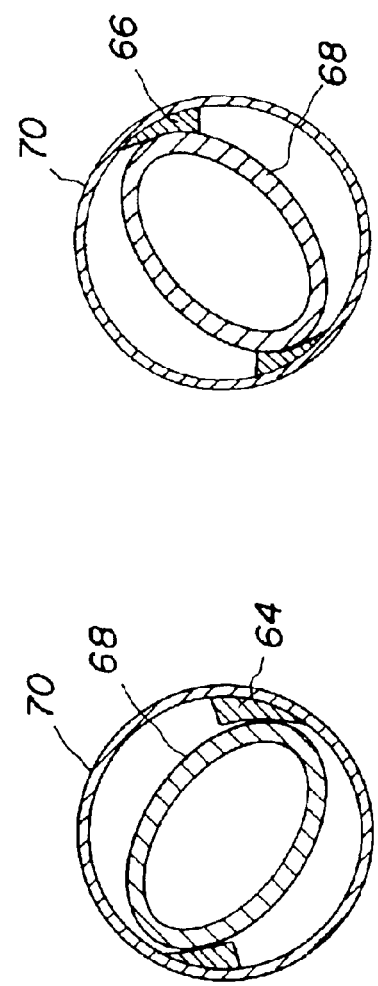
Fig. 11
Fig. 10

FOLDABLE STAND STABILIZER DEVICE

BACKGROUND OF THE INVENTION

1. Field of the Invention

The invention pertains to a stabilizer device or foot for stabilizing a foldable stand or foldable legs of an ironing board. More particularly, the invention pertains to a stabilizer foot for stabilizing foldable legs on a variety of surfaces such as flat wooden or tile floors as well as carpeted or textured floors by employing a rotatable stabilizer foot having on one portion a substantially flat area for stabilizing the ironing board or foldable stand on a flat smooth surface, which stabilier foor then may be rotated and set in a different position to stabilize the ironing board or foldable legs on a soft or uneven surface such as may be encountered with carpeted or textured floors.

2. Description of Related Art Including Information Disclosed Under 37 C.F.R. 1.97 and 1.98

The prior art includes a wide variety of stabilizing devices for stabilizing foldable legs as may be utilized on ironing boards, keyboard stands, and other types of devices utilizing foldable and adjustable legs. Such prior art devices for stabilizing ironing board tables by way of example include Siczkiewicz, Jr., et al. U.S. Pat. No. 2,661,554 and Lehrman U.S. Pat. No. 6,014,827, as well as Mattesky U.S. Pat. No. 4,970,968 which include axially extendable or telescoping legs for increasing the surface area of the leg to stabilize an ironing board or other device with foldable legs. Such prior art assists in the stabilizing of the ironing board by increasing the amount of surface area but is not specifically adapted to accommodate the texture and surface of the confronting floor by utilizing a rotatable stabilizer device having specialized areas for accommodating hard smooth floors, textured floors and soft padded or carpeted floors by providing different radial surfaces on the stabilizer device to accommodate the specific texture and characteristic of the confronting floor.

Other prior art includes anti-slip handles such as Reed U.S. Pat. No. 3,093,172, Pratt U.S. Pat. No. 652,981 and Dell U.S. Pat. No. 2,665,963 which pertain to grips for handles for tools that may include a radially symmetrical or radially asymmetrical surface for assisting in providing a grip or tools and other devices. Such prior art is not for the purpose of accommodating different types of floor surfaces such as hard flat surfaces or soft padded, textured surfaces or a combination of both types of surfaces in which the stabilizer device is designed to be rotated to expose a different radial surface for accommodating a particular type of confronting floor surface.

The prior art while providing various types of stabilizing devices, has not provided a rotatable stabilizing device, which accommodates varying types of surfaces depending upon the rotational position of the stabilizing device.

BRIEF SUMMARY OF THE INVENTION

It is an object of the invention to provide a stabilizing device for stabilizing foldable legs and in particular foldable legs on ironing boards, keyboard stands and other such devices by utilizing a stabilizing foot having different surfaces for accommodating floors of varying textures and hardnesses by rotating the novel stabilizing foot to expose different surfaces for accommodating different types of floors.

It is an object of the invention to provide a novel stabilizing foot of the type described which may be utilized either as an add-on stabilizing foot to existing foldable legs for ironing boards, keyboards and the like, or which may be incorporated as part of a new generation of foldable ironing board and foldable keyboard legs or the like. It is a further object of the invention to provide a stabilizing foot which is easy to manufacture and is of a simple construction for ease of accommodating existing foldable legs or for incorporation into a new generation of stands having foldable legs.

It is a further object of the invention to provide a new generation of devices with foldable legs having rotatable support legs for accommodating different types of floors and surfaces which may or may not telescope to add surface area to the leg to assist in the positioning of the novel stabilizer foot.

These and other objects of the invention are accomplished by employing a stabilizer device having an asymmetrical and substantially circular outside surface which may be disposed over existing foldable legs such as found in ironing boards, keyboards and other such devices with foldable legs or may be integral with the foldable leg.

The novel asymmetrical substantially cylindrical device includes a ribbed surface area to assist in stabilizing the novel stabilizing foot on soft textured flooring such as padded rugs and textured flooring, while another portion of the novel stabilizing foot is substantially flat for accommodating substantially flat hard wooden floors. The novel stabilizing foot is of a length sufficient to add stability to the legs of the foldable device the novel stabilizing foot has at least two different surface areas for accommodating flooring of different textures and degrees of hardness.

In further embodiments of the invention the novel rotatable stabilizer foot may have three different surface portions for accommodating different types of flooring. For example, the novel stabilizer foot may include (1) a flat surface area for accommodating a flat hard floor, (2) a ribbed surface area for accommodating soft rugs or padded rugs as well as (3) a dimpled portion for accommodating floors having a complex textured surface such as a tiled floor with small tiles and numerous grout lines. These various portions on the novel stabilizing leg may be of the same degree of hardness or different degrees of hardness as well as being constructed of different materials for accommodating various types of floor textures and degrees of hardness.

The novel foldable stand stabilizer device may include surface markings for describing the rotatable position for each type of flooring or may include mechanical means such as rotatable stops for selecting a particular rotational position of the novel stabilizer device. The novel stabilizer device may further include telescoping and locking means for locking the novel stabilizer device in a particular position to accommodate a particular type of confronting flooring.

These and other advantages of the invention will be illustrated in the following drawings and detailed description of the invention.

BRIEF DESCRIPTION CF THE SEVERAL VIEWS OF THE DRAWINGS

The objects and advantages of the invention will become more apparent when read in conjunction with the following drawings which are for purpose of illustration rather than limitation as to the invention in which:

FIG. 9 is a side elevational view of a portion of a novel ironing board incorporating the novel rotatable stabilizer of the invention;

FIG. 10 is a view taken along the lines 10—10 of FIG. 9 illustrating one position of the novel rotatable stabilizer device;

FIG. 11 is a view along the lines 11–11 of FIG. 9 showing a second rotatble adjustable position of the novel stabilizer device;

DETAILED DESCRIPTION OF THE INVENTION

Figure 1:
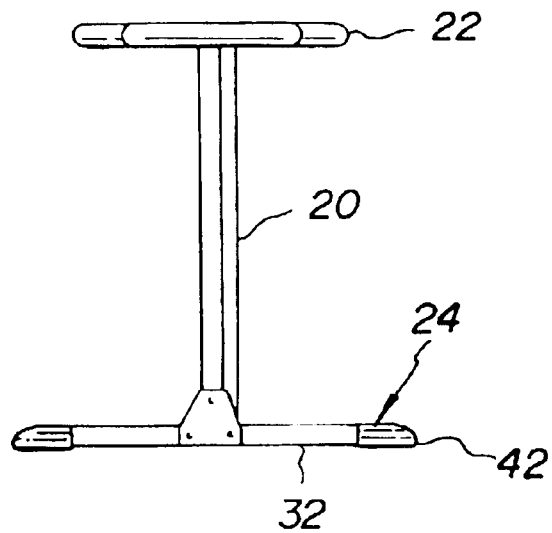
FIG. 1 is a front elevational view of an existing ironing board having the novel stabilizer device of the invention added to the support legs.

Referring now to FIG. 1 a foldable leg support 20 for supporting the keyboard stand, ironing board or other foldable support platform 22 is illustrated utilizing the novel rotatble stabilizer device 24. The novel rotatable stabilizer device 24 may be designed as an add-on device to existing support platforms 22 or may integrated into novel new generation support platforms.

Figure 2:
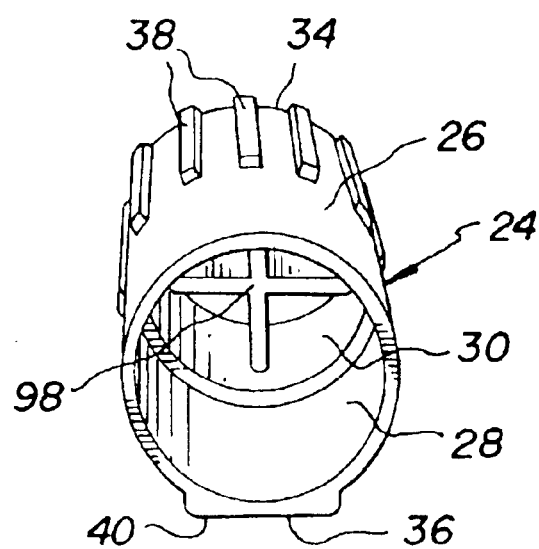
FIG. 2 is a perspective end view of the novel stabilizer device of FIG. 1.
Figure 3:
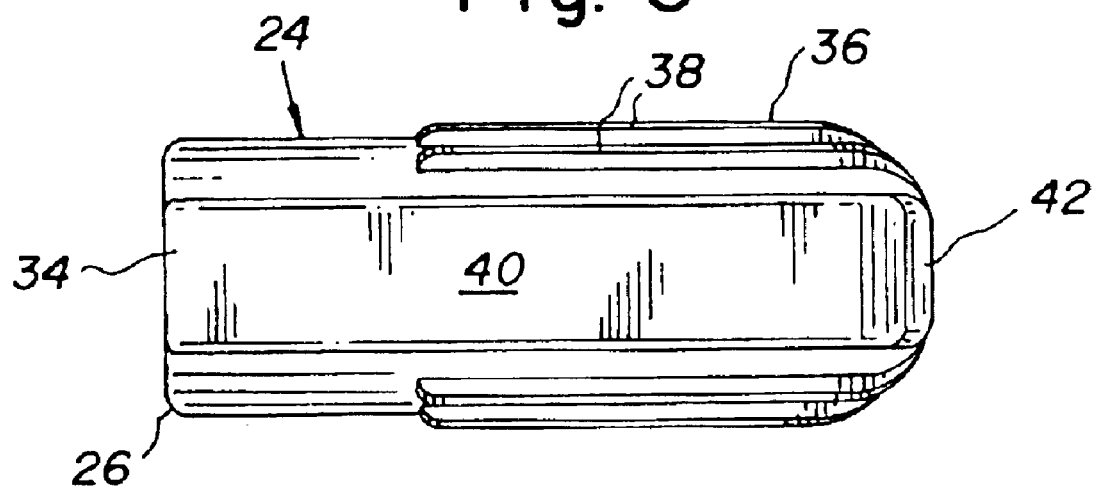
FIG. 3 is a side view of the novel stabilizer device of FIG. 1.
Figure 4:
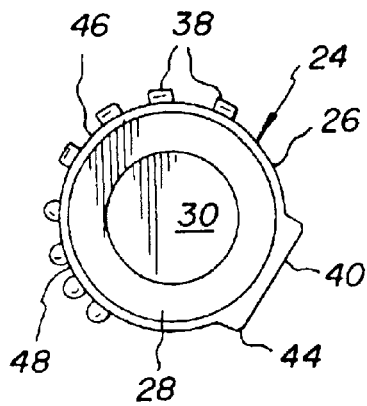
FIG. 4 is an end view of an alternative embodiment of the novel stabilizing device illustrating three separate portions for rotatably accommodating floor surfaces having different textures and hardness.
Figure 5:
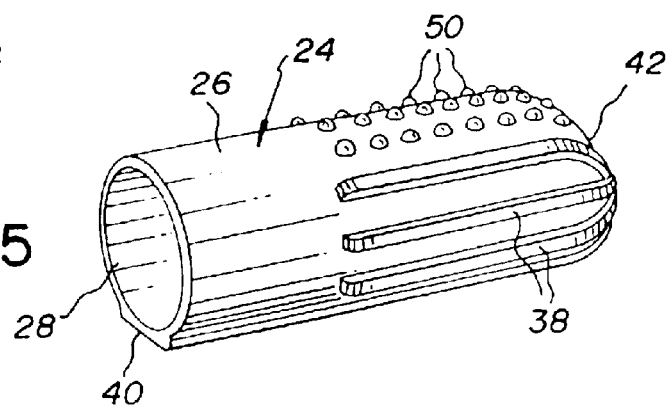
FIG. 5 is a perspective view of the alternative embodiment of the novel stabilizer device of FIG. 4.

Referring now to FIGS. 1, 2 and 3 the novel rotatable support device includes a substantially cylindrical body 26 having an opening 28 for receiving a leg of a foldable stand. The opening 28 may include a further recessed opening of slightly smaller diameter 30 for receiving an existing leg of an existing support platform which may be of a slightly smaller diameter.

Most diameters of existing support leas are either about 1¼ inches (3.175 cm) in cross sectional diameter or 1⅛ inches (2.86 cm) in cross sectional diameters so that the novel rotatable stabilizer device 24 can be used to accommodate legs of differing cross sectional diameters by providing alternative concentric openings 28 and 30. In either case, opening 28 and opening 30 are of such a diameter and axial length as to snugly accommodate existing leg 32 in opening 28 or 30 to snugly engage the novel rotatable stabilizer device 24. In addition the novel rotatable stabilizer device is of sufficient axial length so as to prevent rocking of support platform 22. Generally an axial length of 1 to 7 inches (3.81 cm to 17.8 cm) can be utilized with a preferred length of 3 to 4 inches (7.6 cm to 10.2 cm).

The novel rotatable stabilizer device 24 has at least two non-similar surfaces 34 and 36 for accommodating floors of different textures and hardnesses by mounting novel rotatable stabilizer device 24 on existing leg 32 so that either ribs 38 or flat portion 40 accommodates a floor of different texture and hardness to stabilize the support platform 22. Flat portion 40 is generally utilized where a flat smooth floor such as a wood floor forms the support for the novel rotatable stabilizer device. Where a floor of a different hardness such as a carpeted or padded floor is involved, novel rotatable stabilizer device 24 is rotated so that ribs 38 contact the rug or textured surface to provide the greatest stability for supporting support platform 22. It is also possible to rotate the device such that the interstices between flat portion 40 and ribs 38 contact grooves or seams in the flooring such as is found in tiled surfaces having widely spaced grout lines or seams disposed between large flat and smooth portions of flooring.

The substantially cylindrical body 26 is preferably composed of a high density plastic material and may be of a unitary construction such that ribs 38 and flat portion 40 are composed of the same high density plastic material or ribs 38 and flat portion 40 may be composed of different materials such as a combination of elastomeric and plastic material. Further ribs 38 and flat portion 40 can be made of rubber or are coated with a rubber composition to assist in the stabilization of the novel rotatable stabilizer device. In addition, flat surface 40 may also be coated or made of similar or dissimilar materials to assist in stabilizing the novel rotatable stabilizer device on a particular type of surface. Flat portion 40 may include a taper 42 which portion may connect ribs 38 which may be either straight, angled or crisscrossed to accommodate varying types of floor surfaces.

Referring now to FIGS. 4–8 a further embodiment of the novel rotatable stabilizer device 24 is illustrated having a substantially cylindrical body 26 having at least three dissimilar surfaces 44, 46 and 48. These three dissimilar surfaces may be equally or unequally distributed around the circumference of the novel rotatable stabilizer device. For example, one third of the novel rotatable stabilizer device 24 may include ribs 38, one third of the surface may include a flat portion 40, and one third of the circumference may include a plurality of dimples 50 for accommodating floors of different textures and hardness characteristics.

In the alternative embodiment as illustrated inf FIGS. 4–8 like the previous embodiments as heretofore discussed each of the three dissimilar surfaces, 44,46, and 48 may be composed of the same or different plastic materials and may be either coated or uncoated to assist in the frictional engagement of a flooring surface as well accommodating a particular type of flooring surface as well as hardness.

Figure 7:
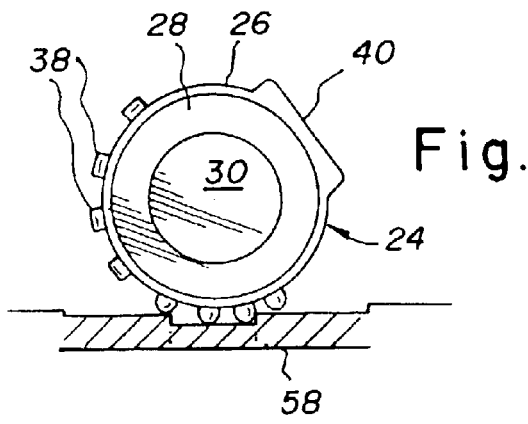
FIG. 7 is an end view similar to FIG. 6 illustrating the stabilizing action of the novel stabilizing device on a tiled or hard textured surface.
Figure 6:
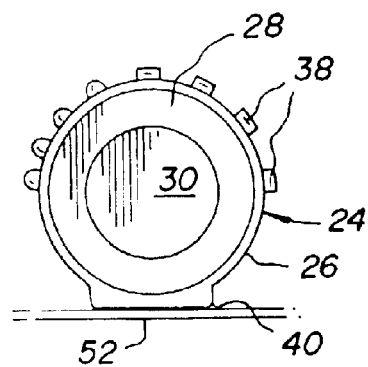
FIG. 6 is an end view of the novel stabilizing device illustrating the stabilizing action of the novel device on a flat hard floor.
Figure 8:
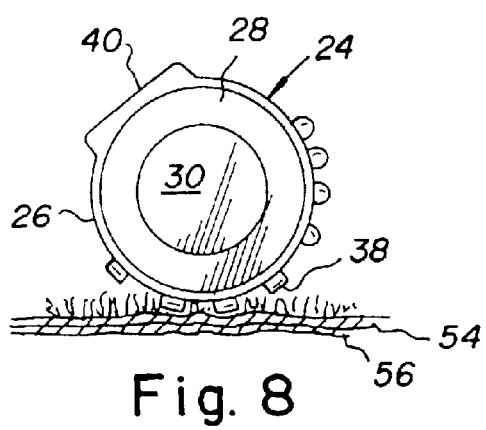
FIG. 8 is a side elevational view similar to FIGS. 6 and 7 illustrating the stabilizing effect of the novel stabilizer on a carpeted or soft surface.

The three dissimilar surfaces 44, 46 and 48 allow the novel rotatable stabilizer device to accommodate a wide variety of flooring types and surfaces such as illustrated in FIGS. 6, 7 and 8. Flat portion 40 is particularly advantageously used for a smooth flat surface such as wood, tile or linoleum such as may be found on floor 52 (FIG. 6.) Ribs 38 are particularly advantageously employed for soft surfaces such as rug 54 which may or may not include an optional pad 56. The novel rotatable stabilizing device can also be rotated from the position in FIG. 8 for accommodating a rug to the position in FIG. 7 for accommodating textured surfaces where dimples 50 accommodate a textured flooring 58 having a flat hard surface with grout lines or seams interposed between flat and hard portions of the floor.

The novel rotatable stabilizing device 24 may be utilized as an add-on device to existing ironing boards, foldable keyboard stands and other foldable support devices or it may be accommodated as an integral portion in the next generation of ironing board, keyboard stands and other types of support devices utilizing foldable legs.

Referring now to FIGS. 9, 10 and 11 novel rotatable stabilizer device 24 may be mounted on a rotatable telescoping shaft 60 having a friction cap 62 along with axially displaced position locks 64 and 66. This may be accomplished by changing the generally circular shape of telescoping shaft 60 to an oval shape 68 inside of leg 70 and utilizing position locks 64 and 66 in different axial locations in leg 70 to lock flat portion 40 in a downward position whereas when rotatable telescoping shaft is further extended to a second portion as illustrated in FIG. 11 the oval portion 68 of rotatable telescoping shaft 60 is designed to contact lock 66 to lock ribs 38 in the downward position as illustrated in FIG. 9. Friction cap 62 may also include threads 72 for engaging and corresponding threads 74 on leg 70 of the ironing board to frictionally engage rotatable telescoping shaft 60 in a particular desired position.

Figure 12:
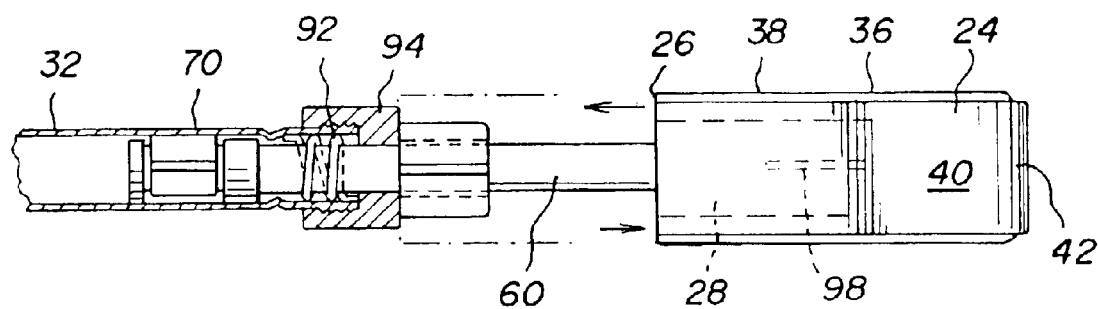
FIG. 12 is a side elevational view partly in section of a novel foldable stand having a novel stabilizer device in accordance with a further embodiment of the invention.
Figure 13:
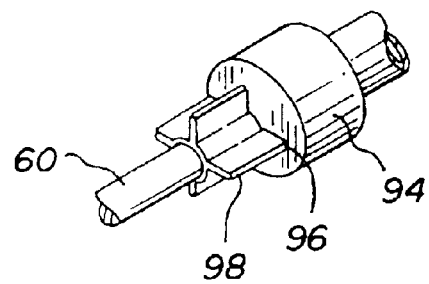
FIG. 13 is a perspective view of the locking mechanism of FIG. 12.

Referring now to FIGS. 12 and 13 a further embodiment of the invention is illustrated in which novel rotatable stabilizer device 24 is mounted on a rotatable telescoping shaft 60 having a spring 92 for biasing telescoping shaft into leg 70. In this embodiment end cap 94 may include an X shaped opening 96 for engaging an X shaped stiffening element 98 (FIG. 2). In this embodiment opening 28 or opening 30 may be designed to fit over end cap 94. Spring 92 biases the novel rotatable stabilizing device 24 over cap 94 which is designed to have an opening for receiving X shaped stiffening element 98. In this embodiment as stabilizing device 24 is axially displaced device 24 can be rotated and then reseated in the X shaped opening 96 of cap 94 so that either flat surface 40 or ribbed surface 38 is available for contacting either a flat smooth wood or tile floor or ribs 38 are available for contacting a soft or carpeted floor for stabilizing support platform 22.

It will be recognized by those skilled in the art that additional mechanical devices are available for accommodating the multiple positions of the novel rotatable stabilizer device aid that those skilled in the art may make considerable modifications and changes in implementing the novel rotatable stabilizer device of the invention.

It is further contemplated that the invention may be adapted or modified to include different types of materials and surfaces for accommodating a wide variety of floors of different types and configurations. It will further be understood that those skilled the art may implement the invention in a variety of ways for particular applications to foldable stands for a variety of uses and purposes which are deemed to be included within the scope of the invention.

It will be recognized that these and other modifications may be made by those skilled in the art without departing from the scope of the invention as defined in the appended claims.

What is claimed is:

1. A leg stabilizing device comprising:
(a) a foldable device having at least one leg;
(b) a substantially cylindrical element having a first stabilizing device surface having a first contact surface and a second stabilizing surface having a second contact surface disposed axially along the length of said substantially cylindrical element said first and second contact surfaces being of different shapes; and
(c) said cylindrical element having means rotationally engaging the at least one leg of the foldable device providing for the positioning of said leg stabilizing device between the first stabilizing surface and the second stabilizing surface relative to a floor.

2. The leg stabilizing device of claim 1 wherein said rotationally engaging means is an opening in said substantially cylindrical element for frictionally engaging said leg.

3. The leg stabilizing device of claim 2 wherein said opening includes a second opening displaced axially from said first opening for frictionally engaging a leg of a different diameter.

4. The leg stabilizing device of claim 2 further comprising a stiffening element displaced axially from said opening.

5. The leg stabilizing device of claim 2 wherein said first stabilizing surface is substantially flat.

6. The leg stabilizing device of claim 2 wherein said second stabilizing surface is ribbed.

7. The leg stabilizing device of claim 1 wherein said rotationally engaging means is part of said leg of said foldable device.

8. The leg stabilizing device of claim 7 wherein said rotationally engaging means includes a device for rotatably positioning said first stabilizing surface and said second stabilizing second surface.

9. The leg stabilizing device of claim 8 further comprising a cross shaped stiffening element for fitting in said device for rotatably positioning said first stabilizing surface and said second stabilizing surface.

10. A device stabilizing the legs of an ironing board comprising:
(a) an elongated rotatable substantially cylindrical element;
(b) a substantially flat surface extending axially along a portion of said elongated rotatable substantially cylindrical element;
(c) a ribbed surface extending axially along a portion of said elongated rotatable substantially cylindrical element; and
(d) engaging means rotatably engaging said elongated rotatable cylindrical element on the ironing board legs to provide for the positioning of said device for stabilizing the ironing board legs between the substantially flat surface and the ribbed surface relative to a floor.

11. The device of claim 10 further comprising a dimpled surface extending axially along a portion of said elongated rotatable substantially cylindrical element.

12. The device of claim 10 wherein said rotatably engaging means is disposed in said ironing board leg.

13. The device of claim 10 wherein said ribbed surface is composed of an elastomeric material.

14. The device of claim 10 further comprising an X shaped stiffening element disposed inside said elongated rotatable substantially cylindrical element.

15. The device of claim 14 wherein said rotatably engaging means engages said X shaped stiffening element.

16. The device of claim 15 wherein said means for rotatably engaging said X shaped stiffening element is an end cap having a corresponding X shaped opening.

17. An apparatus for stabilizing legs comprising:
(a) a leg;
(b) an elongated element having a first stabilizing surface and a second stabilizing surface disposed along the length of said elongated element;
(c) an opening in said elongated element rotatably mounting said elongated element to the leg; and
(d) a stiffening element for stiffening said elongated element, said stiffening element being located in said opening of said elongated element.

18. The apparatus of claim 17 for stabilizing legs wherein said stiffening element is X shaped.

19. The apparatus of claim 17 for stabilizing legs wherein said elongated element has a third stabilizing surface.

20. The apparatus of claim 17 for stabilizing legs further comprising a rotatable mounting means in the leg for engaging said opening and selectively positioning the radial position of said first stabilizing surface and said second stabilizing surface with respect to said leg.

21. An apparatus for stabilizing legs comprising:
   (a) a leg;
   (b) an elongated element having a first stabilizing surface, a second stabilizing surface and a third stabilizing surface disposed along the length of said elongated element, each of said surfaces having a contact surface of different shapes;
   (c) an opening in said elongated element rotatably mounting said elongated element to the leg; and
   (d) a stiffening element for stiffening said elongated element, said stiffening element being located in said opening of said elongated element.

22. A leg stabilizing device comprising a substantially cylindrical element having a first stabilizing surface and a second stabilizing surface disposed axially along the length of said substantially cylindrical element, said substantially cylindrical element having an opening frictionally engaging the leg of a foldable device to facilitate positioning said leg stabilizing device between the first stabilizing surface and the second stabilizing surface relative to a floor, wherein said opening includes a second opening being displaced axially from said first opening, said second opening having a different diameter relative to said first opening for frictionally engaging the leg of a foldable device of different cross sectional diameter.

* * * * *